United States Patent [19]

Papantoniou et al.

[11] 3,911,105
[45] Oct. 7, 1975

[54] FATTY COMPOSITIONS FOR USE IN COSMETIC MAKEUP COMPOSITIONS AND SAID COSMETIC MAKEUP COMPOSITIONS

[75] Inventors: Christos Papantoniou, Epinay-sur-Seine; Jean Boulogne, L'Hay-les-Roses, both of France

[73] Assignee: Societe Anonyme dite: L'Oreal, Paris, France

[22] Filed: June 7, 1974

[21] Appl. No.: 477,516

[30] Foreign Application Priority Data
June 8, 1973 Luxemburg............................ 67773

[52] U.S. Cl. ................. 424/64; 252/316; 252/317; 260/37 P; 260/85.7; 260/86.1 R; 260/86.1 E; 260/89.1; 260/89.5 R; 424/DIG. 5; 424/59; 424/63; 424/70; 424/78; 424/168; 424/172; 424/357; 424/365
[51] Int. Cl.².......................................... A61K 7/025
[58] Field of Search........... 424/63, 64, 70, 78, 365, 424/DIG. 5, 168, 172; 252/316, 317; 260/37 P

[56] References Cited
UNITED STATES PATENTS

| | | | |
|---|---|---|---|
| 3,055,297 | 9/1962 | Leeds............................... | 424/78 X |
| 3,088,876 | 5/1963 | Buth ........................ | 424/64 |
| 3,148,125 | 9/1964 | Strianse et al. ....................... | 424/64 |
| 3,321,408 | 5/1967 | Briggs............................ | 424/365 X |
| 3,406,238 | 10/1968 | Freyermuth et al. ............. | 424/63 X |
| 3,489,690 | 1/1970 | Lachampt et al................. | 424/63 X |
| 3,574,822 | 4/1971 | Shepherd et al.................. | 424/63 X |
| 3,639,572 | 2/1972 | Heinrich et al....................... | 424/63 |
| 3,708,435 | 1/1973 | Starkman........................ | 424/64 X |

*Primary Examiner*—Albert T. Meyers
*Assistant Examiner*—Vera C. Clarke
*Attorney, Agent, or Firm*—Cushman, Darby & Cushman

[57] ABSTRACT

A fatty composition for use in producing cosmetic composition comprising a mixture of at least one cosmetic fatty body and at least one non-toxic polymer selected from the group consisting of a. a homopolymer having repeating units of the formula

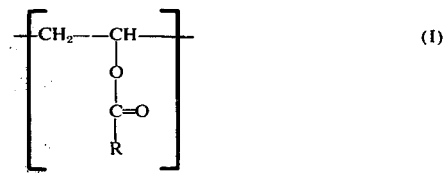

wherein R represents a saturated hydrocarbon chain, branched or linear, having 6–19 carbon atoms; and b. a homopolymer having repeating units of the formula

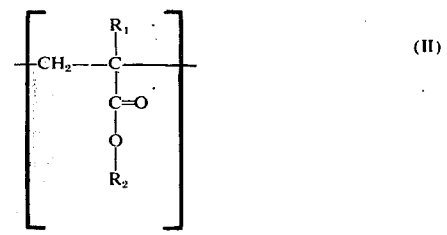

wherein $R_1$ represents hydrogen or methyl, and $R_2$ represents a saturated hydrocarbon chain, branched or linear, having 10–20 carbon atoms.

This fatty composition is employed to produce a cosmetic makeup composition, such as lip rouge, in paste or stick form, or mascara, and is present in said cosmetic composition in amounts of 99.5–15 percent by weight of the total weight of the cosmetic composition.

12 Claims, No Drawings

FATTY COMPOSITIONS FOR USE IN COSMETIC MAKEUP COMPOSITIONS AND SAID COSMETIC MAKEUP COMPOSITIONS

The present invention relates to a new fatty composition usefully employed in the production of cosmetic products and especially make-up products such as lip rouge in stick or paste form and mascara. The present invention also relates to cosmetic compositions containing said fatty composition.

As is well known cosmetic compositions of the type as lip rouge in stick or paste form, or mascara, are constituted principally by a fatty base which is a mixture of one or more waxes and one or more oils.

The oils and waxes which can be used for the production of such make-up compositions are quite diverse, their choice depending primarily on the ultimate use of the compositions.

Up to now, one has exclusively visualized the use of certain oils or waxes of animal, vegetable or mineral origin, or of certain synthetic substances having properties analogous to those of natural substances and being able thus to replace them.

Although utilized currently in cosmetics these oils and waxes, which are of natural or synthetic origin, do not permit to confer to the lip rouge in stick or paste form and to mascara totally satisfactory characteristics in that which concerns on the one hand the firmness of the sticks and on the other hand, the brilliance, the better adherence and the persistance of the film deposited on the lips or on the eyelashes.

In effect, it is necessary on the one hand that the lip rouge in the form of a stick exhibits good firmness so that during application it does not break or fracture and on the other hand that the lip rouge in the form of a paste and the mascara exhibit a good adherence and have sufficient brilliance.

The applicants have found, after considerable research, in a way quite surprising, that it is possible to produce excellent make-up products and especially lip rouge in stick or paste form and mascara, having the different characteristics noted above when there is used as the fatty base a composition containing in admixture at least one cosmetic fatty body and at least one polymer of a particular type having a great affinity for the fatty body and being non-toxic.

The present invention has then for an object, a new fatty composition for use in the production of cosmetic products, this new fatty composition being characterized by the fact that it comprises in admixture at least one cosmetic fatty body and at least one non-toxic homopolymer selected from the group consisting of a. a homopolymer having repeating units of the formula

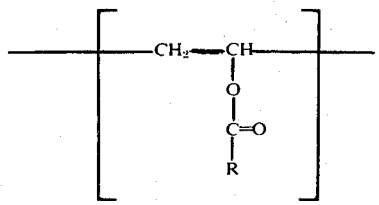

(I)

wherein R represents a saturated linear or branched hydrocarbon chain having 6–19 carbon atoms, and b. a homopolymer having repeating units of the formula

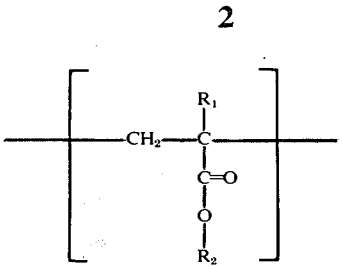

wherein $R_1$ represents hydrogen or methyl, and $R_2$ represents a saturated linear or branched hydrocarbon chain having 10–20 carbon atoms.

According to the invention, one means by the term "fatty body" a wax or a mixture of waxes, or even a mixture of at least one wax and at least one oil. Preferably, the "fatty body" according to the invention comprises from 6 to 100% of at least one wax and from 0–94% of at least one oil.

The presence in the fatty composition of at least one homopolymer such as defined above, permits to impart to make-up products present in the form of a stick a great resistance to breaking, excellent brilliance and very good holding power of the film deposited on the lips.

For the compositions present in the form of a paste, and principally lip rouge or lip polish, the presence of at least one homopolymer imparts to these compositions very good unctuousness, great flexibility and excellent brightness of the film deposited on the lips as well as good adherence and improvement in the persistance of the brightness of the film.

For the compositions present in the form of mascara, the presence of a homopolymer also improves the adherence of the film and increases the resistance to water of the film deposited on the eyelashes.

The above described homopolymers exhibit the characteristics of being fat-soluble, that is, they have a great affinity for waxes and oils with which they are admixed. It is this important property which achieves the excellent characteristics of the cosmetic compositions produced with the fatty composition of the present invention.

The fat-solubility of the homopolymers is conferred by the presence, in the form of branching, of fatty chains having from 6 to 20 carbon atoms and preferably from 10 to 18 carbon atoms.

According to the invention, the fatty body is present in amounts between about 65 to 98%, but preferably from about 75 to 95% and the homopolymer is present in amounts of about 2 to 35% by preferably between about 5 to 25% relative to the total weight of the fatty composition.

As has been stated above, the fatty body can be constituted by one or more waxes and in this case, they can be for example ozokerite, lanolin, lanolin alcohol, hydrogenated lanolin, acetylated lanolin, lanolin wax, beeswax, candellila wax, microcrystalline wax, carnauba wax, cetyl alcohol, stearyl alcohol, spermaceti, cocoa butter, fatty acids of lanolin, petrolatum, Vaseline, the mono-, di- and tri-glycerides which are solid at 25°C., fatty esters which are solid at 25°C., silicone waxes such as methyloctadecane-oxypolysiloxane and poly (dimethylsiloxy) stearoxysiloxane, stearly monoethanolamide, rosin and its derivatives such as glycol and glycerol abietates, hydrogenated oils solid at 25°C, sucroglycerides, and the oleates, myristates, lanolates, stearates and dihydroxystearates of Ca, Mg, Zr and Al.

The fatty body can also be constituted by a mixture of at least one wax and at least one oil and in this case the oil can be for example, paraffin oil, Purcellin oil, perhydrosqualene, sweet almond oil, avocado oil, calophyllum oil, ricin oil, horse oil, hog oil, olive oil, mineral oil having a boiling point between 310°–410°C, silicone oil such as dimethylpolysiloxane, linoleic alcohol, linolenic alcohol, oleyl alcohol, cereal germ oil such as wheat germ oil, isopropyl lanolate, isopropyl plamitate, isopropyl myristate, butyl myristate, cetyl myristate, hexadecyl stearate, butyl stearate, decyl oleate, acetyl glycerides, the octanoates and decanoates of alcohols and polyalcohols such as glycol and glycerol, the ricinoleates of alcohols and polyalcohols such as that of cetyl, isostearyl alcohol, isocetyl lanolate, isopropyl adipate, hexyl laurate and octyl dodecanol.

As indicated above, the polymers employed in the fatty composition are homopolymers, i.e. they are exclusively constituted by the repeating units of formulae (I) or (II).

The homopolymers used in accordance with the present invention are for the most part known and have a molecular weight between about 2,000 and 500,000 and preferably between 6,000 and 300,000.

Among the homopolymers of formula (I) usefully employed in the fatty composition of the present invention one can mention, particularly, those resulting from the homopolymerization of vinyl hexanoate, of vinyl 2,2-dimethyl pentanoate, vinyl octanoate, vinyl cecanoate, vinyl laurate, vinyl stearate or vinyl isostearate.

Among the homopolymers of formula (II) usefully employed in the fatty composition of the present invention, one can mention particularly, those resulting from the homopolymerization of the acrylates or methacrylates of lauryl and stearyl.

According to the invention the homopolymers can also be crosslinked with the use of certain types of crosslinking agents which have for their purpose the sensible increase in their molecular weight.

This crosslinking is effected during the homopolymerization and the crosslinking agents are selected depending on the nature of the monomer which is being homopolymerized. Thus in the case of vinyl esters leading to units of formula (I), one uses, preferably, a crosslinking agent selected from the group consisting of diallyl ether, tetraallyloxyethane, diallylamine, diallyl melamine, divinyl benzene, divinyl octanedioate, divinyl dodecanedioate, divinyl octadecanedioate and diallyl phthalate.

In the case of acrylic or methacrylic esters leading to units of formula (II), one uses on the contrary a crosslinking agent selected from the group consisting of ethylene glycol diacrylate, ethylene glycol dimethacrylate, 1,8-octane diol diacrylate, 1,8-octane diol dimethacrylate, 1,14-tetradecane diol diacrylate, 1,14-tetradecane diol dimethacrylate 1,18-octadecane diol diacrylate, 1,18-octadecane diol dimethacrylate and tetraethylene glycol dimethacrylate.

According to one particular embodiment of the present invention one uses preferably the following homopolymers: polyvinyl stearate, polyvinyl stearate crosslinked with the aid of divinyl benzene or diallyl ether, polyvinyl laurate, polyvinyl cecanoate, polystearyl methacrylate, polystearyl methacrylate crosslinked with the aid of ethylene glycol dimethacrylate, poly vinyl 2,2-dimethyl pentanoate and poly lauryl methacrylate.

The homopolymers, crosslinked or not, usefully employed in the present invention, can be obtained according to conventional methods, i.e. by polymerization in mass, in suspension, in solution or in emulsion.

Preferably, the polymerization is effected in solution in an organic solvent or in suspension in water.

As catalysts one can use, for example, benzoyl peroxide, lauroyl peroxide or azo-bis-isobutyronitrile.

The polymerization temperature is generally between about 50°–130°C.

The present invention also has for an object solid or semi-solid cosmetic compositions containing as the fatty composition the composition defined above.

According to the invention, the amount of fatty composition in the cosmetic composition, is generally between about 99.5 to 15 percent by weight based on the total weight of the cosmetic composition, it being understood that the amount of homopolymer relative to the total weight of the cosmetic composition cannot be lower than 1.5 weight percent thereof.

These compositions according to the invention can be present either in the form of lip rouge in stick or paste form or in the form of mascara.

When the compositions according to the invention are present in the form of sticks, they can be either lip rouge or lip polish. The difference between these two forms resides in the fact that the lip polish does not contain or contains only a very slight amount of dye simply to tint the stick but not enough to impart to the lips any significant coloration.

In this particular embodiment, the fatty composition according to the invention is present preferably in an amount between about 75 to 99.5 percent relative to the total weight of the stick.

The different components which can be introduced into these sticks are those conventionally used for this type of formulation. Among those one can mention particularly dyes soluble or insoluble, which are generally present in an amount between about 6–15%, solvents for certain dyes insoluble in the fatty body and notably eosine derivatives, pearlescent agents in amounts of about 2–20%, perfume, anti-solar agents, antioxidants and preservatives.

Among the different dyes for lip rouge one can mention particularly the eosines and other halogenated derivatives of fluorescein (bromo-acids) and especially those known under the name of D and C Red No. 21, D and C Red No. 27, D and C Orange No. 5, inorganic pigments such as the oxides of iron, chromium, ultramarines (polysulfides of amino silicates) and titanium dioxide, these compounds being employed in amounts of about 1-6%, organic pigments such as D and C Red No. 36 and D and C Orange No. 17.

Finally in the dyes one can also include lakes such as the calcium lakes of D and C Red No. 7, 21 and 27, the barium lakes of D and C Red No. 6 and 9, the aluminum lakes of D and C Red No. 21 and of D and C Yellow No. 5 and 6 and the zirconium lakes of D and C Red NO. 21 and of D and C Orange No. 5.

Among the solvents for the dyes insoluble in the oils one can mention glycols, esters of tetrahydrofurfuryl, polyethylene glycols and monoalkanolamides.

Among the pearlescent agents one can mention particularly bismuth oxychloride, mica-titanium and the crystals of guanine.

Among the anti-oxidants one can mention particularly those of the phenolic type such as the propyl, octyl and dodecyl esters of gallic acid, butylated hydroxy anisole, butylated hydroxy toluene and nordihydroguaiaretic acid.

When the compositions are present in the form of paste they can also be lip rouge or lip polish and contain then the same components as the sticks. In this form of the invention the fatty composition is also present in amounts essentially the same as in the sticks.

However, in the latter the amount of wax is lower and it is preferable not to exceed 85% wax relative to the total weight of the fatty composition.

These compositions which are under the form of sticks or pastes are preferably anhydrous. However, in certain cases they can contain certain quantities of water not exceeding, generally, about 8–10 percent relative to the total weight of the cosmetic composition.

When the cosmetic compositions according to the invention are present in the form of mascara, these are in the form of a semi-solid and can be either anhydrous or aqueous.

In this particular form of the invention, the amount of fatty composition according to the invention is preferably between about 15–40 percent relative to the total weight of the mascara composition.

When the mascara is anhydrous it contains in addition to the fatty composition, a volatile component in amounts generally between about 35–50 percent relative to the total weight of the mascara composition. Among the volatile components one can mention particularly isoparaffin, oil of turpentine, isopropyl alcohol, ethyl alcohol, white spirits and the like.

When, to the contrary, the mascara composition is aqueous (generally in the form of an oil-in-water emulsion) it contains, preferably, from 50–70 percent by weight of water relative to the total weight of the mascara composition, from 8–20 percent of an emulsifying agent such as the stearate or oleate or stearyl oleate of amino propane diol, of morpholine, of mono-, di- or triethanolamine, of mono-, di- or triisopropanolamine, polyoxyethylenated fatty ethers or esters of polyglycerol fatty ethers or esters and the like, and a component to improve the adherence and the drawing of the mascara such as for example cellulose derivatives such as hydroxy cellulose or even gum arabic.

The mascara compositions which are anhydrous or aqueous also contain dye agents and more particularly certain pigments such as carbon black or black iron oxide, chrome oxide, red and yellow iron oxides and finally certain metallic powders such as those of silver or aluminum.

The mascara composition according to the invention can also contain other conventional components such as perfume, anti-oxidants and preservatives.

As has been indicated above, the compositions which are present in the form of sticks, pastes or mascara must not contain a quantity of homopolymer less than 1.5 percent by weight relative to the total weight of those various types of compositions.

In that which concerns the maximum concentration of the homopolymer in the cosmetic compositions, this is generally a function of the relative amounts of the fatty composition, and is about 35% and preferably about 25% for the sticks and pastes and about 15% and preferably about 10% for the mascara compositions.

The following examples illustrate the preparation of homopolymers and several fatty compositions and cosmetic compositions according to the present invention.

EXAMPLES OF THE PREPARATION OF HOMOPOLYMERS

Example 1

Preparation of polyvinylstearate in solution

Into a 500 ml round-bottomed flask provided with mechanical agitation means, a nitrogen lead-in tube and a condenser, one introduces 100 g of vinyl stearate, 43 g of acetone and 0.5 g of benzoyl peroxide. The solution is heated at reflux for 24 hours, then one adds thereto 200 g of acetone previously heated to 40°C. One then slowly cools the solution with vigorous agitation and the polymer then precipitates in the form of a white powder.

Viscosity: 0.97 cp (5% in toluene at 34.6°C).
$\overline{M}_n = 34000$ (osmometry in toluene).

Example 2

Preparation of polyvinylstearate in suspension.

Into a one liter round-bottomed flask provided with mechanical agitation means, a nitrogen lead-in tube and a condenser, one introduces 300 g of an aqeuous solution containing 1.8 g of Cellosize, and 1.5 g of benzoyl peroxide dissolved in 50 g of vinyl stearate.

The solution is heated to 80°C, with agitation, for 8 hours and one recovers, after cooling, the polymer in the form of pearls.

$\overline{M}_n = 34,000$
$\overline{M}_p = 95,000$
$\frac{dn}{dc} = 0.076 \ (THF)$

Example 3

Preparation of polyvinyl stearate crosslinked with the aid of divinyl benzene.

Into a one liter round-bottomed flask provided with an agitator, a nitrogen lead-in tube and a condenser, one introduces 100 g of vinyl acetate, 100 g of acetone, 0.6 g of divinyl benzene and 4 g of benzoyl peroxide.

The solution is heated at reflux for 24 hours with agitation. One then adds thereto 500 g of acetone previously heated to 40°C. The solution is then slowly cooled with vigorous agitation. The polymer then precipitates in the form of a white powder.

Viscosity: 0.83 cp (5% in toluene at 34.6°C).

Example 4

Preparation of polyvinyl stearate crosslinked with the aid of diallyl ether.

Following the operating conditions set forth in Example 3 one polymerizes vinyl stearate as follows:

| | |
|---|---|
| Vinyl stearate | 100 g |
| Acetone | 60 g |
| Diallyl ether | 0.2 g |
| Benzoyl peroxide | 2.5 g |

One thus obtains in the form of a white powder the desired homopolymer.

Viscosity: 0.94 cp (5% in toluene at 34.6°C).

Example 5

Preparation of polyvinyl stearate crosslinked with the aid of divinyl benzene.

By proceeding in accordance with the method of Example 3 one polymerizes vinyl stearate under the following conditions:

| | |
|---|---|
| Vinyl stearate | 62.5 g |
| Acetone | 37.5 g |
| Divinyl benzene | 0.2 g |
| Benzoyl peroxide | 2.5 g |

One thus obtains in the form of a white powder the desired polymer.

Viscosity: 0.92 cp (5% in toluene at 34.6°C).

Examples 6–11

By operating in a manner essentially outlined in Example 3, other homopolymers are obtained. These are listed in Table A below.

| | |
|---|---|
| Ozokerite | 16 g |
| Lanolin | 28 g |
| Oleyl alcohol | 10 g |
| Cetyl ricinoleate | 20 g |
| Triglycerides of octanoic acid | 20 g |
| Oil of wheat germ | 1 g |
| Homopolymer of Example 1 | 5 g |

Example 13

One prepares according to the invention a pearlescent lip rouge in the form of a stick having the following composition:

| | |
|---|---|
| Fatty composition B | 79.9 g |
| Butylated hydroxy toluene antioxidant | 0.1 g |
| Trimethyl benzylidene heptanone anti-solar agent | 1 g |
| Dyes: | |
|   Titanium oxide | 1 g |
|   Aluminum lake of D and C Red No. 27 | 1.5 g |
|   Black iron oxide | 1 g |
|   Yellow Iron oxide | 0.5 g |
|   Mica-titanium | 15 g |

TABLE A

| Example | Homopolymer Prepared | Polymerization Solvent | Ratio Monomer: Solvent | Nature and % of Catalyst | Precipitating Agent (c) | Iodine Index (d) | Viscosity (cp) (a) |
|---|---|---|---|---|---|---|---|
| 6 | Polyvinyl laurate | Acetone | 1:1 | Benzoyl Peroxide-6% | Methanol | 0.68 | 0.85 |
| 7 | Polyvinylce-canoate (e) | Acetone | 1:1 | Benzoyl Peroxide-4% | Methanol | 0.9 | 0.84 |
| 8 | Polystearyl methacrylate | Toluene | 1:1 | Benzoyl Peroxide-4% | Methanol | 1.68 | 2.58 |
| 9 | Polystearyl methacrylate crosslinked with 0.02% ethylene glycol dimethacrylate | Toluene | 1:1 | Benzoyl Peroxide-4% | Methanol | 0.42 | 2.41 |
| 10 | Polyvinyl-2,2-dimethyl pentanoate | Acetone | 1:1 | Benzoyl Peroxide-4% | Water | 1.0 | 0.91(b) |
| 11 | Polylauryl-methacrylate | Acetone | 1:1 | Benzoyl Peroxide-4% | Methanol | 0 | 3.58 |

Remarks: All the homopolymers of Examples 6–11 have been prepared by heating at 80°C for 24 hours.
(a) the viscosities have been measured in a 5% solution in toluene at 34.6°C.
(b) the viscosity for this homopolymer was measured in a 5% solution in chloroform at 34.6°C.
(c) at the end of the polymerization reaction the mixture is poured into the indicated solvent to precipitate the homopolymer
(d) this index was measured after drying under reduced pressure at 60°C.
(e) vinyl ester of cecanoic acid, branched acid containing on the average 10 carbon atoms (sold by Societe Kuehmann)

EXAMPLES OF COMPOSITIONS ACCORDING TO THE INVENTION

Example 12

One prepares according to the invention a lip rouge in the form of a stick having the following composition:

| | |
|---|---|
| Fatty composition A | 89.9 g |
| Butylated hydroxy toluene antioxidant | 0.1 g |
| Trimethyl benzylidene heptanone-anti-solar agent | 1 g |
| Perfume | 1 g |
| Dyes: | |
|   Titanium oxide | 4.5 g |
|   D and C Red No. 36 | 1 g |
|   Aluminum lake of F.D.C. Yellow 6 | 1 g |
|   Aluminum lake of D and C Red No. 27 | 1.5 g |

The fatty composition A is an admixture of the following components:

The fatty composition B is an admixture of the following components:

| | |
|---|---|
| Candellila wax | 9 g |
| Microcrystalline wax | 4 g |
| Mineral oil | 13 g |
| Cetyl ricinoleate | 15 g |
| Lanolin | 15 g |
| Lanolin (liquid) | 25 g |
| Isopropyl lanolin | 14 g |
| Homopolymer of Example 2 | 5 g |

Example 14

One prepares according to the invention a transparent lip polish in the form of a stick having the following composition:

| | |
|---|---|
| Fatty composition C | 96.9 g |
| Butylated hydroxy anisole | |

-Continued

| | |
|---|---|
| antioxidant | 0.1 g |
| Perfume | 1 g |
| Dyes: | |
| Zirconium lake of D and C Red No. 21 | 0.5 g |
| D and C Red No. 36 | 1 g |
| Aluminum lake of F.D.C. Yellow No. 5 | 0.5 g |

The fatty composition C is an admixture of the following components:

| | |
|---|---|
| Ozokerite | 12.5 g |
| Carnauba wax | 2 g |
| Candellila wax | 2 g |
| Hydrogenated lanolin | 5 g |
| Ricin oil | 38.5 g |
| Oleyl alcohol | 15 g |
| Isopropyl lanolate | 10 g |
| Lanolin (liquid) | 5 g |
| Homopolymer of Example 1 | 10 g |

Example 15

One prepares according to the invention a lip rouge in the form of a stick having the following composition:

| | |
|---|---|
| Fatty composition D | 89.8 g |
| Butylated hydroxy toluene antioxidant | 0.1 g |
| Trimethyl benzylidene heptanone anti-solar agent | 1 g |
| Perfume | 1 g |
| Dyes: | |
| Titanium oxide | 2.2 g |
| Aluminum lake of D and C Red No. 27 | 3.6 g |
| Black iron oxide | 0.4 g |
| D&C Red No. 36 | 0.9 g |
| Aluminum lake of D and C Yellow No. 6 | 1 g |

The fatty composition D is an admixture of the following components:

| | |
|---|---|
| Microcrystalline wax | 9 g |
| Lanolin | 30 g |
| Oleyl alcohol | 9 g |
| Cetyl ricinoleate | 20 g |
| Triglycerides of octanoic acid | 16 g |
| Isopropyl lanolate | 10 g |
| Oil of wheat germ | 1 g |
| Homopolymer of Example 6 | 5 g |

Example 16

One prepares according to the invention a lip rouge in the form of a stick having the following composition:

| | |
|---|---|
| Fatty composition D' | 82.5 g |
| Butylated hydroxy toluene-antioxidant | 0.1 g |
| Perfume | 1 g |
| Dyes: | |
| Titanium oxide | 1.8 g |
| D and C Orange No. 5 | 0.3 g |
| Aluminum lake of D & C Yellow No. 6 | 8.8 g |
| D and C Red No. 6 | 5.5 g |

The fatty composition D' is identical to the fatty composition D except that the 5g of the homopolymer of Example 6 therein have been replaced by the same quantity of the homopolymer of Example 7.

Example 17

One prepares in accordance with the invention a pearlescent lip rouge in the form of a stick having the following composition:

| | |
|---|---|
| Fatty composition D'' | 78.85 g |
| Butylated hydroxy toluene | 0.1 g |
| Perfume | 1 g |
| Dyes: | |
| Zirconium lake of D and C Red No. 21 | 0.8 g |
| Black iron oxide | 0.05 g |
| D and C Orange No. 5 | 0.2 g |
| D and C Red No. 36 | 0.8 g |
| Aluminum lake of D and C Yellow No. 6 | 3.2 g |
| Mica-titanium | 15 g |

The fatty composition D'' is identical to the fatty composition D except that the 5g of the homopolymer of Example 6 therein have been replaced by the same quantity of the homopolymer of Example 11.

Example 18

One prepares in accordance with the invention a pearlescent lip rouge in the form of a stick having the following composition:

| | |
|---|---|
| Fatty composition E | 76.1 g |
| Butylated hydroxy toluene-Antioxidant | 0.1 g |
| Perfume | 1 g |
| Dyes: | |
| Black iron oxide | 0.4 g |
| Aluminum lake of D and C Yellow No. 6 | 2.7 g |
| D and C Orange No. 5 | 0.2 g |
| Yellow iron oxide | 1.4 g |
| D and C Red No. 6 | 3.1 g |
| Mica-titanium | 15 g |

Fatty composition E is an admixture of the following components:

| | |
|---|---|
| Ozokerite | 18 g |
| Lanolin | 15 g |
| Oleyl alcohol | 11 g |
| Cetyl ricinoleate | 10 g |
| Triglycerides of octanoic acid | 15 g |
| Isopropyl lanolate | 10 g |
| Oil of wheat germ | 1 g |
| Homopolymer of Example 8 | 20 g |

Example 19

One prepares in accordance with the invention a lip polish in the form of a paste having the following composition:

| | |
|---|---|
| Fatty composition F | 97.9 g |
| Butylated hydroxy toluene-antioxidant | 0.1 g |
| Perfume | 1 g |
| Dyes: | |
| Titanium oxide | 0.2 g |
| Zirconium lake of D and C Red No. 21 | 0.3 g |
| Aluminum lake of F.D.C. Yellow No. 6 | 0.2 g |
| D and C Red No. 36 | 0.3 g |

The fatty composition F is an admixture of the following components:

| | |
|---|---|
| Lanolin | 35 g |
| Lanolin-liquid | 35 g |
| Vaseline | 15 g |
| Mineral oil | 9 g |

-Continued

| | |
|---|---|
| Microcrystalline wax | 1 g |
| Homopolymer of Example 5 | 5 g |

Example 20

One prepares in accordance with the invention a pearlescent lip polish in the form of a paste having the following composition:

| | |
|---|---|
| Fatty composition G | 80.9 g |
| Butylated hydroxy anisol-antioxidant | 0.1 g |
| Perfume | 1 g |
| Dyes: | |
|   Aluminum lake of D and C Red No. 27 | 0.5 g |
|   D and C Red No. 36 | 0.5 g |
|   Aluminum lake of F.D.C. Yellow No. 5 | 0.5 g |
|   Bismuth oxychloride | 16.5 g |

The fatty composition G is an admixture of the following components:

| | |
|---|---|
| Lanolin | 35 g |
| Lanolin wax | 5 g |
| Oleyl alcohol | 16 g |
| Cetyl ricinoleate | 10 g |
| Mineral oil | 3 g |
| Ricin oil | 25 g |
| Homopolymer of Example 3 | 6 g |

Example 21

One prepares in accordance with the invention a lip polish in the form of a paste having the following composition:

| | |
|---|---|
| Fatty composition H | 97.04 g |
| Butylated hydroxy toluene-antioxidant | 0.1 g |
| Perfume | 1 g |
| Dyes: | |
|   Zirconium lake of D and C Red No. 21 | 0.4 g |
|   Calcium lake of D and C Red No. 7 | 0.12 g |
|   Black iron oxide | 0.14 g |
|   Aluminum lake of D and C Yellow No. 6 | 1.2 g |

The fatty composition H is an admixture of the following components:

| | |
|---|---|
| Microcrystalline wax | 2.5 g |
| Ozokerite | 3.5 g |
| Lanolin | 15 g |
| Lanolin-liquid | 30 g |
| Mineral oil | 30 g |
| Bentonite-cationic | 4 g |
| Homopolymer of Example 9 | 15 g |

Example 22

One prepares in accordance with the invention a slightly pearlescent lip polish in paste form having the following composition:

| | |
|---|---|
| Fatty composition I | 93.95 g |
| Butylated hydroxy toluene-antioxidant | 0.1 g |
| Perfume | 1 g |
| Dyes: | |
|   D and C Red No. 21 | 0.05 g |
|   Zirconium lake of D and C Red No. 21 | 0.2 g |
|   Calcium lake of D and C Red No. 7 | 0.2 g |
|   Aluminum lake of D and C Yellow No. 6 | 0.5 g |
|   Mica-titanium | 4 g |

Fatty composition I is an admixture of the following components:

| | |
|---|---|
| Microcrystalline wax | 1.5 g |
| Ozokerite | 2 g |
| Lanolin-liquid | 28 g |
| Mineral oil | 16 g |
| Lanolin | 20 g |
| Mineral oil - solidified | 15 g |
| Bentonite - cationic | 7.5 g |
| Homopolymer of Example 8 | 10 g |

Example 23

One prepares in accordance with the invention a lip polish in the form of a paste having the following composition:

| | |
|---|---|
| Fatty composition J | 93.5 g |
| Butylated hydroxy toluene-Antioxidant | 0.1 g |
| Perfume | 1 g |
| Dyes: | |
|   Titanium oxide | 0.2 g |
|   Zirconium lake of D and C Red No. 21 | 2.9 g |
|   Black iron oxide | 0.2 g |
|   D and C Orange No. 5 | 0.2 g |
|   D and C Red No. 36 | 0.8 g |
|   Yellow iron oxide | 1.1 g |

Fatty composition J is an admixture of the following components:

| | |
|---|---|
| Lanolin - liquid | 35 g |
| Lanolin | 35 g |
| Vaseline | 10 g |
| Homopolymer of Example 11 | 20 g |

Example 24

One prepares in accordance with the invention a lip rouge in the form of a paste having the following composition:

| | |
|---|---|
| Fatty composition K | 85.9 g |
| Butylated hydroxy toluene-antioxidant | 0.1 g |
| Bentonite - cationic | 5 g |
| Perfume | 1 g |
| Dyes: | |
|   Titanium oxide | 1 g |
|   Aluminum lake of D and C Red No. 27 | 3 g |
|   Calcium lake of D and C Red No. 7 | 4 g |

The fatty composition K is an admixture of the following components:

| | |
|---|---|
| Lanolin | 20 g |
| Isopropyl lanolin | 20 g |
| Mineral oil | 5 g |
| Oleyl alcohol | 10 g |
| Hydrogenated lanolin | 10 g |
| Cetyl ricinoleate | 10 g |
| Ricin oil | 20 g |
| Homopolymer of Example 4 | 5 g |

Example 25

One prepares in accordance with the invention a lip rouge in paste form having the following composition:

| | |
|---|---|
| Fatty composition L | 78.9 g |
| Butylated hydroxy toluene- | |

| | |
|---|---|
| Antioxidant | 0.1 g |
| Perfume | 1 g |
| Bentonite - cationic | 4 g |
| Dyes: | |
|   Calcium lake of D and C Red No. 7 | 1.5 g |
|   D and C Red No. 30 | 3 g |
|   Aluminum lake of F.D.C. Red No. 5 | 1.5 g |
|   Mica-titanium | 10 g |

Fatty composition L is an admixture of the following components:

| | |
|---|---|
| Microcrystalline wax | 1 g |
| Candellila wax | 2 g |
| Lanolin wax | 5 g |
| Ricin oil | 10 g |
| Cetyl ricinoleate | 10 g |
| Mineral oil | 30 g |
| Isopropyl decanoic lanolate | 17 g |
| Triglycerides of octanoic acid | 18 g |
| Homopolymer of Example 1 | 7 g |

In fatty composition L, the 5 g of the homopolymer of Example 1 can advantageously be replaced by the same quantity of one of the homopolymers prepared in accordance with Examples 6, 7, 10 and 11.

Example 26

One prepares in accordance with the invention a mascara having the following composition:

| | |
|---|---|
| Fatty composition M | 18 g |
| Oleostearate of aminopropanediol | 12 g |
| Hydroxyethyl cellulose | 1 g |
| Demineralized water | 58.8 g |
| Black iron oxide | 10 g |
| Methyl para hydroxy benzoate | 0.2 g |

Fatty composition M is an admixture of the following components:

| | |
|---|---|
| Carnauba wax | 99 g |
| Homopolymer of Example 1 | 11 g |

In fatty composition M the 11 g of the homopolymer of Example 1 can advantageously be replaced by the same quantity of the homopolymer prepared in accordance with Example 2.

Example 27

One prepares in accordance with the invention a mascara having the following composition:

| | |
|---|---|
| Fatty composition N | 18 g |
| Oleostearate of aminopropanediol | 12 g |
| Hydroxyethyl cellulose | 1 g |
| Demineralized water | 58.8 g |
| Yellow iron oxide | 6 g |
| Black iron oxide | 4 g |
| Methyl para hydroxy benzoate | 0.2 g |

Fatty composition N is an admixture of the following components:

| | |
|---|---|
| Carnauba wax | 89 g |
| Homopolymer of Example 4 | 11 g |

Example 28

One prepares in accordance with the invention a mascara having the following composition:

| | |
|---|---|
| Fatty composition O | 18 g |
| Oleostearate of aminopropanediol | 12 g |
| Hydroxyethyl cellulose | 1 g |
| Demineralized water | 58.8 g |
| Polysulfide of aminosilicate | 8 g |
| Black iron oxide | 2 g |
| Methyl para hydroxy benzoate | 0.2 g |

Fatty composition O is an admixture of the following components:

| | |
|---|---|
| Carnauba wax | 89 g |
| Homopolymer of Example 3 | 11 g |

In fatty composition O the 11 g of the homopolymer of Example 3 can advantageously be replaced by the same quantity of the homopolymer of Example 5.

Example 29

One prepares in accordance with the invention an anhydrous mascara having the following composition:

| | |
|---|---|
| Fatty composition P | 39 g |
| Isoparaffin | 56.8 g |
| Black iron oxide | 4 g |
| Methyl para hydroxy benzoate | 0.2 g |

Fatty composition P is an admixture of the following components:

| | |
|---|---|
| Beeswax | 62.5 g |
| Lanolin alcohol | 12.5 g |
| Acetylated lanolin | 10 g |
| Homopolymer of Example 1 | 15 g |

In fatty composition P, the 15 g of the homopolymer of Example 1 can advantageously be replaced by the same quantity of one of the homopolymers prepared according to Examples 8, 9 and 11.

Example 30

One prepares in accordance with the invention an anhydrous mascara having the following composition:

| | |
|---|---|
| Fatty composition Q | 39 g |
| Isoparaffin | 56.8 g |
| Black iron oxide | 4 g |
| Methyl para hydroxy benzoate | 0.2 g |

Fatty composition Q is an admixture of the following components:

| | |
|---|---|
| Beeswax | 62.5 g |
| Lanolin alcohol | 12.5 g |
| Acetylated lanolin | 10 g |
| Homopolymer of Example 3 | 15 g |

In fatty composition Q the 15 g of the homopolymer of Example 3 can advantageously be replaced by the same quantity of one of the homopolymers prepared according to Examples 6, 7 and 10.

What is claimed is:

1. A fatty composition for use in producing a cosmetic composition selected from the group consisting of a lip rouge and a mascara comprising a mixture of
   i. at least one cosmetic fatty body consisting essentially of about 6–100 100 percent of at least one cosmetic wax and 0–94 percent of at least one cosmetic oil and ii. at least one non-toxic homopolymer selected from the group consisting of a. a homopolymer having repeating units of the formula

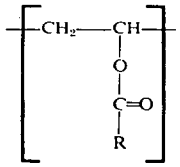

wherein R represents a saturated hydrocarbon chain, branched or linear, having 6–19 carbon atoms; and b. a homopolymer having repeating units of the formula

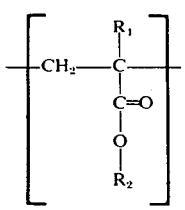

wherein
$R_1$ represents hydrogen or methyl, and
$R_2$ represents a saturated hydrocarbon chain, branched or linear, having 10–°carbon atoms, said homopolymer having a molecular weight between 2,000 and 500,000 and said homopolymer being present in amounts of about 2–35 percent by weight relative to the total weight of the fatty composition.

2. The fatty composition according to claim 1 wherein said wax is selected from the group consisting of ozokerite, lanolin, lanolin alcohol, hydrogenated lanolin, acetylated lanolin, lanolin wax, beeswax, candellila wax, microcrystalling wax, carnauba wax, cetyl alcohol, stearyl alcohol, spermaceti, cocoa butter, fatty acid of lanolin, petrolatum, mono-, di- and tri-glyceride solid at 25°C, fatty ester solid at 25°C, silicone wax, stearyl monoethanolamide, rosin, glycol abietate, glycerol abietate, hydrogenated oil solid at 25°C, sucroglyceride and an oleate, myristate, lanolate, stearate and dihydroxystearate of calcium, magnesium, zirconium and aluminum.

3. The fatty composition according to claim 1, wherein said oil is selected from the group consisting of paraffin oil, perhydrosqualene, sweet almond oil, avocado oil, calophyllum oil, ricin oil, horse oil, hog oil, olive oil, mineral oil having a boiling point between 310°–410°C, silicone oil, linoleic alcohol, linolenic alcohol, oleyl alcohol, cereal germ oil, isopropyl lanolate, isopropyl palmitate, isopropyl myristate, butyl myristate, cetyl myristate, hexadecyl stearate, butyl stearate, decyl oleate, acetyl glyceride, octanoate and decanoate of glycol and glycerol, ricinoleate of cetyl alcohol and isostearyl alcohol, isocetyl lanolate, isopropyl adipate, hexyl lanolate and octyl dodecanol.

4. The fatty composition of claim 1 wherein the homopolymer of formula I is selected from the group consisting of polyvinyl hexanoate, polyvinyl-2,2-dimethyl pentanoate, polyvinyl octanoate, polyvinyl cecanoate, polyvinyl laurate, polyvinyl stearate and polyvinyl isostearate.

5. The fatty composition of claim 1 wherein the homopolymer of formula II is selected from the group consisting of polylauryl acrylate, polylauryl methacrylate, polystearyl acrylate and polylauryl methacrylate.

6. The fatty composition according to claim 1 wherein the homopolymer of formula I is crosslinked with a crosslinking agent selected from the group consisting of diallylether and divinylbenzene.

7. The fatty composition according to claim 1 wherein the homopolymer of formula II is crosslinked with ethylene glycol dimethacrylate.

8. A cosmetic composition selected from the group consisting of a lip rouge and a mascara comprising the fatty composition of claim 1 in an amount between 99.5–15 percent by weight of the total weight of the cosmetic composition, and a dyeing agent in an amount of 6–15 per-cent by weight, the amount of the homopolymer relative to the total weight of the cosmetic composition being at least 1.5 weight percent.

9. The cosmetic composition of claim 8 wherein said fatty composition is present in amounts between 75–99.5 percent, the quantity of the wax in said fatty composition not exceeding 85 percent relative to the total weight of the fatty composition.

10. The cosmetic composition of claim 8 wherein water is also present in an amount not exceeding 8–10 percent relative to the total weight of the cosmetic composition.

11. The cosmetic composition of claim 8 wherein said fatty composition is present in an amount between 15–40 percent by weight and also contains water in an amount from 50–70 percent by weight of the total weight of the cosmetic composition.

12. A lip polish comprising the fatty composition of claim 1 in an amount of 15–99.5 percent by weight and an amount of a dye from none to an amount sufficient to tint the lip polish.

* * * * *

UNITED STATES PATENT OFFICE
CERTIFICATE OF CORRECTION

Patent No. 3,911,105  Dated October 7, 1975

Inventor(s) Christos Papantoniou and Jean Boulogne

It is certified that error appears in the above-identified patent and that said Letters Patent are hereby corrected as shown below:

Column 14, line 68 (last line), delete "100" (second occurrence)

Column 15, line 31, change "10-°" to --10-20--

Column 15, line 40, change "microcrystalling" to --microcrystalline--

$\mathcal{S}$igned and $\mathcal{S}$ealed this twentieth Day of April 1976

[SEAL]

Attest:

RUTH C. MASON  
*Attesting Officer*

C. MARSHALL DANN  
*Commissioner of Patents and Trademarks*